(12) United States Patent
Tanaka

(10) Patent No.: US 8,309,267 B2
(45) Date of Patent: Nov. 13, 2012

(54) POLYMER ELECTROLYTE FUEL CELL

(75) Inventor: Shiro Tanaka, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/131,762

(22) PCT Filed: Oct. 23, 2009

(86) PCT No.: PCT/JP2009/068238
§ 371 (c)(1),
(2), (4) Date: Aug. 10, 2011

(87) PCT Pub. No.: WO2010/061703
PCT Pub. Date: Jun. 3, 2010

(65) Prior Publication Data
US 2011/0287334 A1    Nov. 24, 2011

(30) Foreign Application Priority Data

Nov. 28, 2008 (JP) .............................. P2008-305002

(51) Int. Cl.
*H01M 4/86* (2006.01)
*H01M 8/10* (2006.01)
(52) U.S. Cl. ......... 429/481; 429/483; 429/523; 429/529
(58) Field of Classification Search ................... 429/481
See application file for complete search history.

(56) References Cited

U.S. PATENT DOCUMENTS

| 6,835,477 | B1 | 12/2004 | Brambilla et al. | |
|---|---|---|---|---|
| 7,794,863 | B2 | 9/2010 | Horiguchi | |
| 7,897,291 | B2 * | 3/2011 | Takahashi et al. | 429/480 |
| 8,043,767 | B2 * | 10/2011 | Benson | 429/514 |
| 2005/0164071 | A1 | 7/2005 | Horiguchi | |
| 2005/0221146 | A1 | 10/2005 | Horiguchi | |
| 2005/0244689 | A1 | 11/2005 | Horiguchi et al. | |
| 2005/0244702 | A1 | 11/2005 | Horiguchi | |
| 2008/0318111 | A1 * | 12/2008 | Wang et al. | 429/34 |

FOREIGN PATENT DOCUMENTS

| JP | 2002-542591 A | 12/2002 |
|---|---|---|
| JP | 2005-209470 A | 8/2005 |
| JP | 2005-268233 A | 9/2005 |
| JP | 2005-285685 A | 10/2005 |
| JP | 2005-317322 A | 11/2005 |
| JP | 2005-340179 A | 12/2005 |
| JP | 2005-349463 A | 12/2005 |
| JP | 2006-294327 A | 10/2006 |
| JP | 2006-294404 A | 10/2006 |
| JP | 2008-243572 A | 10/2008 |

* cited by examiner

*Primary Examiner* — John S Maples
(74) *Attorney, Agent, or Firm* — Foley & Lardner LLP

(57) ABSTRACT

A polymer electrolyte fuel cell (10) includes: a polymer electrolyte membrane (20); an electrode catalyst layer (90c) provided on one surface of the polymer electrolyte membrane (20); a separator (80c) having electrical conductivity, and shielding gas; and an electrode member (50c) interposed between the electrode catalyst layer (90c) and the separator (80c) and constituting an electrode together with the electrode catalyst layer (90c). The electrode member (50c) includes: first contact portions (111) in direct contact with the electrode catalyst layer (90c); second contact portions (112) in direct contact with the separator (80c); and gas diffusion paths (121) through which the gas flows. The electrode member (50c) is provided with a large number of pores (131) formed therein, and constituted by a plate member (100) having electrical conductivity and bent into a wave shape.

12 Claims, 8 Drawing Sheets

(a)

(b)

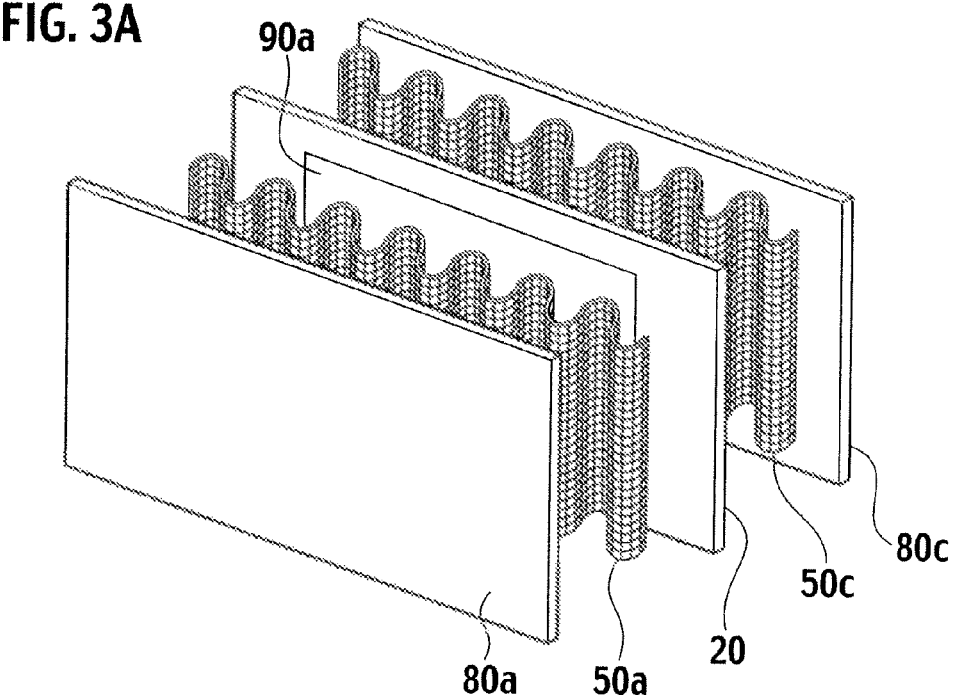
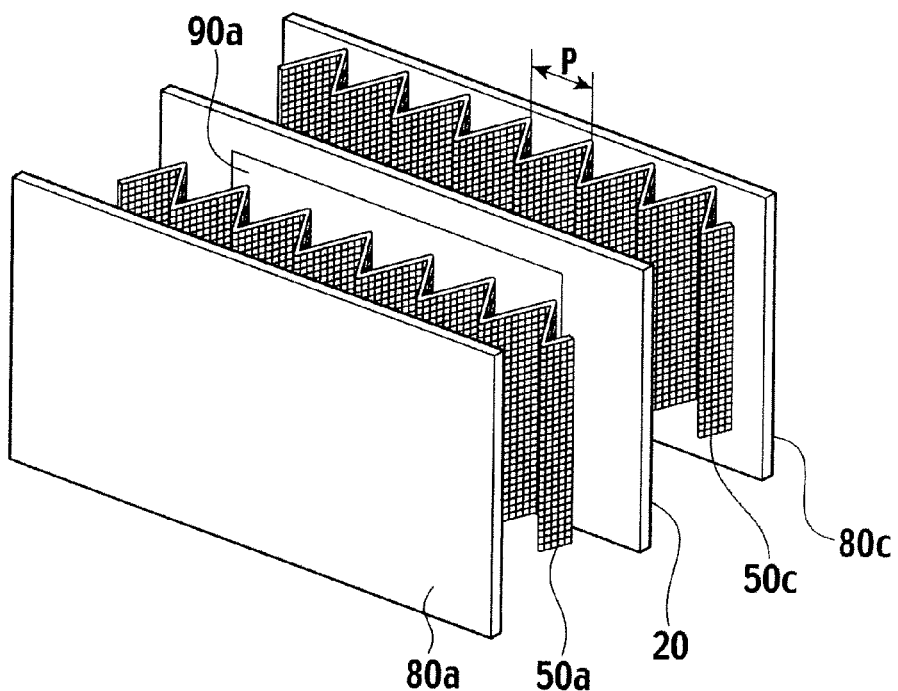

(a)

(b)

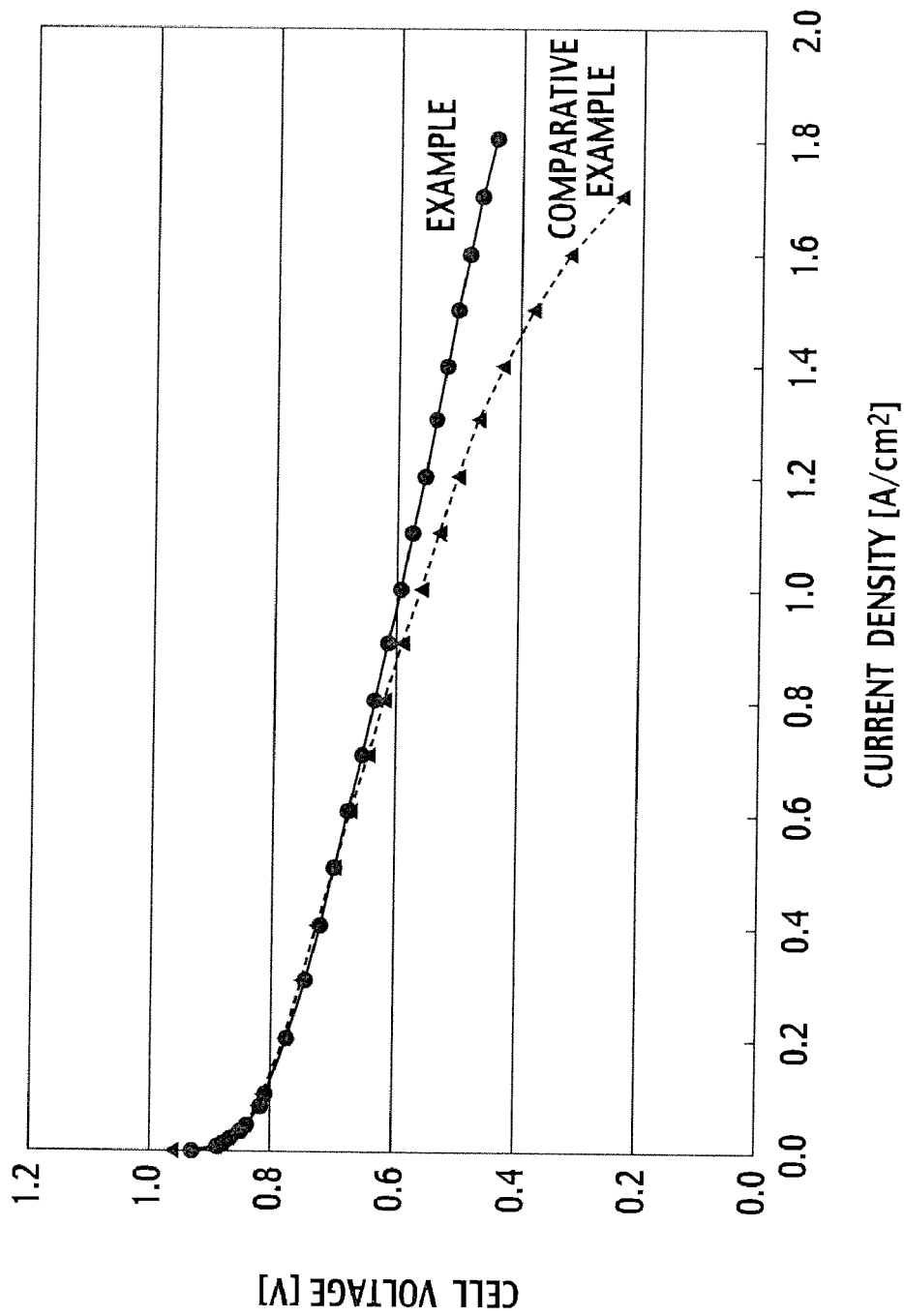

POLYMER ELECTROLYTE FUEL CELL

TECHNICAL FIELD

The present invention relates to a polymer electrolyte fuel cell.

BACKGROUND ART

A polymer electrolyte fuel cell (PEFC) has a stacked structure constituted by a plurality of single cells that have a power generation function. Each of single cells has a membrane electrode assembly (MEA) including: (1) a polymer electrolyte membrane (for example, Nafion (registered trademark) membrane); (2) a pair of catalyst layers to interpose the polymer electrolyte membrane therebetween; and (3) a pair of gas diffusion layers (GDL) to interpose the pair of the catalyst layers therebetween and disperse supply gas. The MEA in one single cell is electrically connected to another MEA in an adjacent single cell via a separator. Then, a fuel cell stack is constituted by a plurality of the single cells that are stacked on top of each other. The fuel cell stack thus obtained functions as a power generation means available for various purposes.

In the fuel cell stack, the separator functions to electrically connect the adjacent single cells to each other, as described above. In addition, the surface of the separator facing the MEA is generally provided with a gas flow path. Such a gas flow path functions as a gas supply means to supply fuel gas and oxidant gas to an anode and a cathode, respectively.

The following is a simple explanation of a power generation mechanism of the PEFC. At the time of the operation of the PEFC, fuel gas (such as hydrogen gas) is supplied to an anode side of the single cell, and oxidant gas (such as air and oxygen) is supplied to a cathode side. Accordingly, electrochemical reactions represented by the following reaction formulae proceed at the anode and cathode sides, respectively, so as to generate electricity.

Anode reaction: $H_2 \rightarrow 2H^+ + 2e^-$ (1)

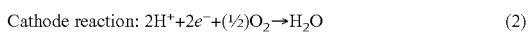

Cathode reaction: $2H^+ + 2e^- + (½)O_2 \rightarrow H_2O$ (2)

In order to promote the electrochemical reactions, the GDL is required to have a gas supply function to effectively diffuse and supply fuel gas and oxidant gas to the catalyst layers. Patent Literature 1 suggests a constitution using porous foam metal as the GDL.

CITATION LIST

Patent Literature

Patent Literature 1: Japanese Patent Translation Publication N 2002-542591

SUMMARY OF INVENTION

However, a relatively high pressure loss is caused in the porous foam metal since fine pores are randomly formed in the porous foam metal. Therefore, a sufficient gas supply function cannot be achieved because of a decrease in gas diffusion rate, and therefore, an electrochemical reaction is interrupted. As a result, an output of the fuel cell is decreased.

The present invention has been made in view of such conventional problems. It is an object of the present invention to provide a polymer electrolyte fuel cell capable of achieving a high output power by decreasing a pressure loss of a gas diffusion path and ensuring a sufficient gas supply function.

A polymer electrolyte fuel cell according to an aspect of the present invention comprises: a polymer electrolyte membrane; an electrode catalyst layer provided on one surface of the polymer electrolyte membrane; a separator having electrical conductivity, and shielding gas; and an electrode member interposed between the electrode catalyst layer and the separator and constituting an electrode together with the electrode catalyst layer. The electrode member comprises: first contact portions in direct contact with the electrode catalyst layer; second contact portions in direct contact with the separator; and gas diffusion paths through which the gas flows. The electrode member is provided with a large number of pores formed therein, and constituted by a plate member having electrical conductivity and bent into a wave shape.

BRIEF DESCRIPTION OF DRAWINGS

FIG. 3A is a view showing an example of a wave shape of an electrode member, and a schematic perspective view showing a PEFC including an electrode member having a sinusoidal wave shape.

FIG. 3B is a view showing an example of a wave shape of an electrode member, and a schematic perspective view showing a PEFC including an electrode member having a triangular wave shape.

FIG. 9 is a diagram showing an evaluation result of a power generation test of each single cell for an evaluation test in an example and a comparative example.

DESCRIPTION OF EMBODIMENTS

Figure 1:
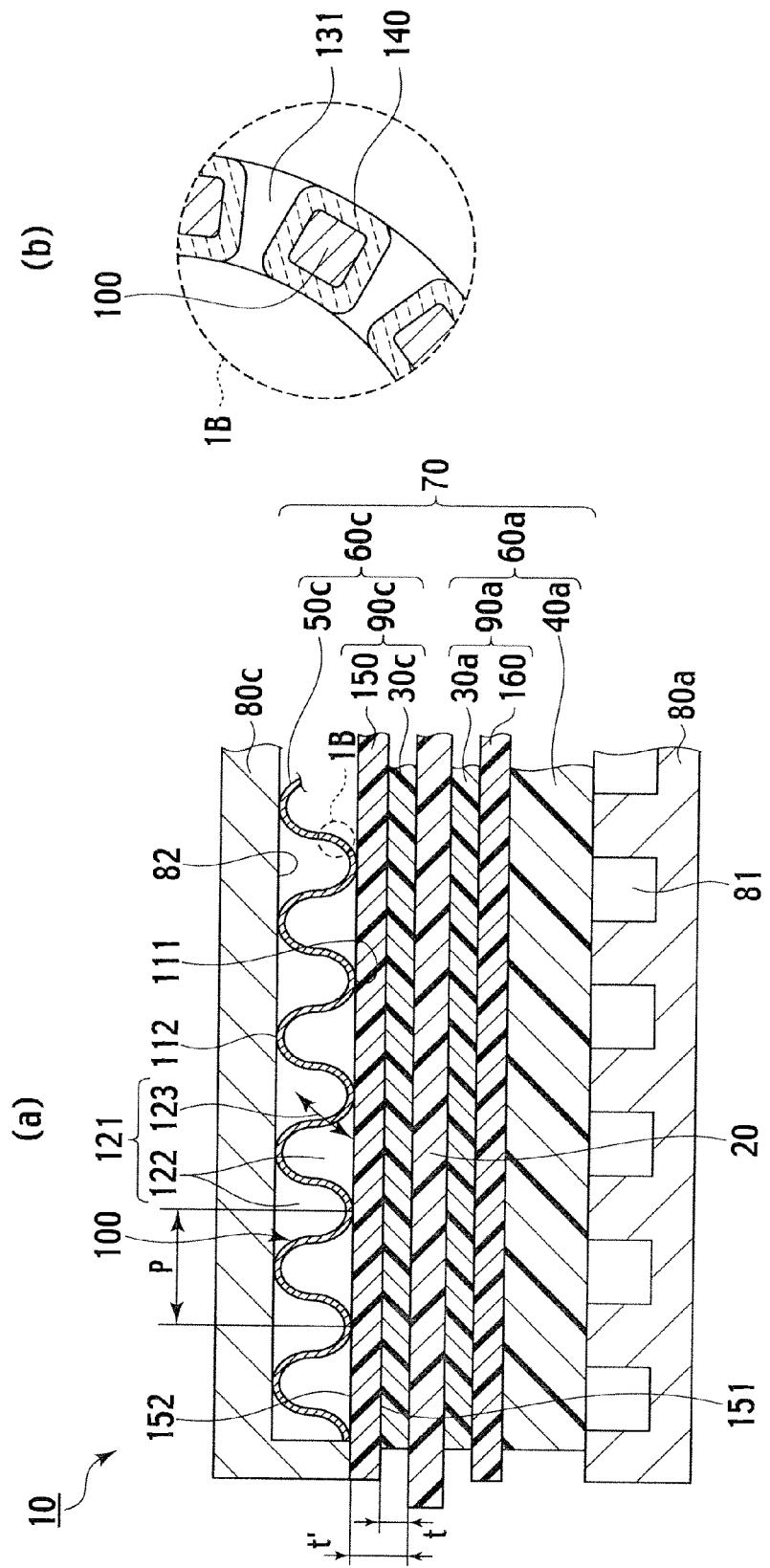
FIG. 1(a) is a schematic cross-sectional view showing a fundamental constitution of a polymer electrolyte fuel cell according to a first embodiment of the present invention.
FIG. 1(b) is an enlarged cross-sectional view of an area 1B surrounded by a dashed line in FIG. 1(a).

A description will be made below in detail of a polymer electrolyte fuel cell (PEFC) according to the present invention with reference to the drawings. Note that dimensional ratios in the drawings are inflated for convenience of explanation, and may be different from the actual ratios.

First Embodiment

A polymer electrolyte fuel cell (PEFC) 10 according to the present embodiment includes a polymer electrolyte membrane 20 as shown in FIG. 1(a). One surface of the polymer electrolyte membrane 20 is provided with a cathode electrode catalyst layer 90c and a cathode separator 80c having electrical conductivity for shielding gas. In addition, an electrode member 50c constituting a cathode 60c together with the cathode electrode catalyst layer 90c is provided between the cathode electrode catalyst layer 90c and the cathode separator 80c. The other surface of the polymer electrolyte membrane 20 is provided with an anode electrode catalyst layer 90a and an anode separator 80a having electrode conductivity for shielding gas in a similar manner to the cathode separator 80c. In addition, a gas diffusion layer 40a constituting an anode 60a together with the anode electrode catalyst layer 90a is provided between the anode electrode catalyst layer 90a and the anode separator 80a.

The polymer electrolyte membrane 20, the anode electrode catalyst layer 90a, the cathode electrode catalyst layer 90c, the gas diffusion layer 40a and the electrode member 50c are stacked to constitute a membrane electrode assembly (MEA) 70. Moreover, a plurality of the MEAs 70 are subsequently stacked via the separators 80a and 80c to constitute a fuel cell stack. In such a fuel cell stack, gas sealing members may be provided between the separators 80a and 80c and the polymer electrolyte membrane 20; however, the gas sealing members are omitted in FIG. 1(a).

As described below in detail, the electrode member 50c has a gas supply function to supply oxidant gas to the electrode catalyst layer 90c and a current collecting function. The electrode member 50c includes first contact portions 111 in contact with the electrode catalyst layer 90c, second contact portions 112 in contact with the separator 80c, and gas diffusion paths 121 through which oxidant gas flows. The electrode member 50c is composed of a plate member 100 having electrical conductivity provided with a large number of pores 131 and bent into a wave shape.

In the PEFC 10 according to the present embodiment, the electrode catalyst layer 90c includes a catalyst component layer 30c containing a catalyst component, and a protection layer 150 having electrical conductivity to prevent damage of the catalyst component layer 30c. The protection layer 150 is interposed between the catalyst component layer 30c and the electrode member 50c, and has a first surface 151 in direct contact with the catalyst component layer 30c and a second surface 152 in direct contact with the first contact portions 111 of the electrode member 50c.

The electrode member 50c may be applied to at least one of the anode 60a and the cathode 60c. However, the electrode member 50c is applied only to the cathode 60c in the present invention, and the commonly-used gas diffusion layer 40a is applied to the anode 60a. Hereinafter, the electrode member 50c in the cathode 60c is referred to as a "cathode electrode member 50c", and the gas diffusion layer 40a in the anode 60a is referred to as an "anode gas diffusion layer 40a". In addition, an electrode member in the anode 60a is referred to as an "anode electrode member", using "50a" for a reference numeral. The following is an explanation of each component of the PEFC 10 according to the present embodiment.

(Electrode Member)

Figure 2:
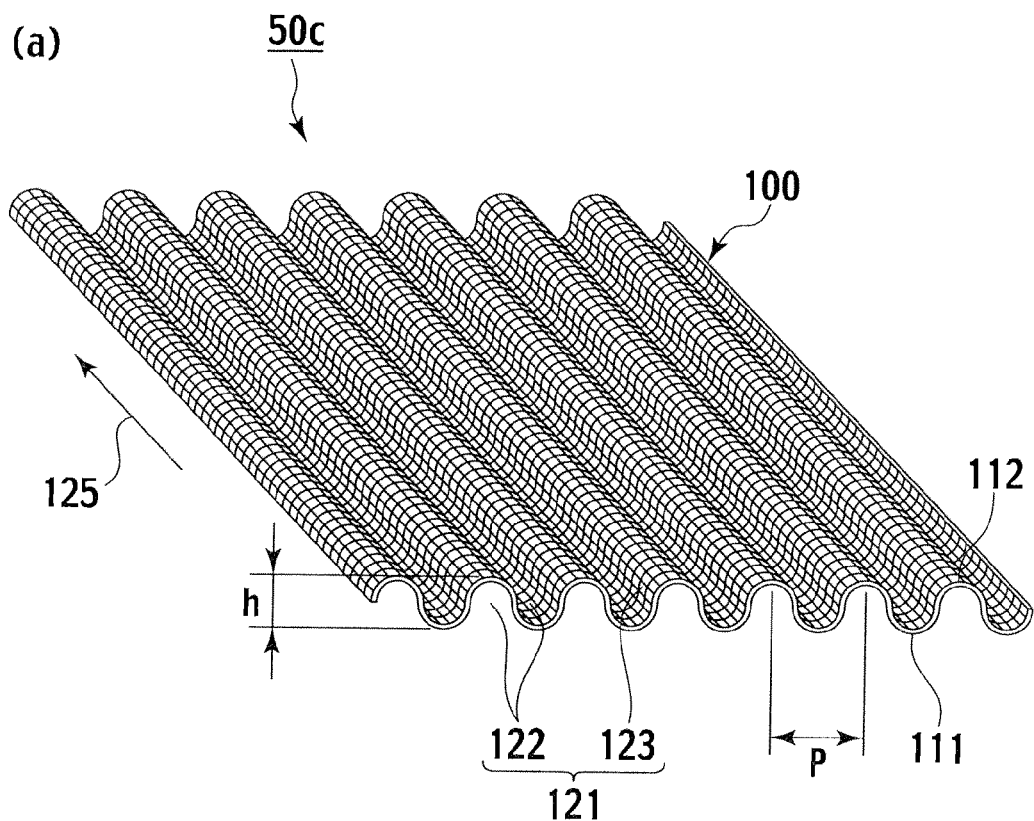
FIG. 2(a) is a perspective view showing an electrode member of FIG. 1(a)
FIG. 2(b) is an enlarged plan view showing one example of a plate member constituting an electrode member.
Figure 2:
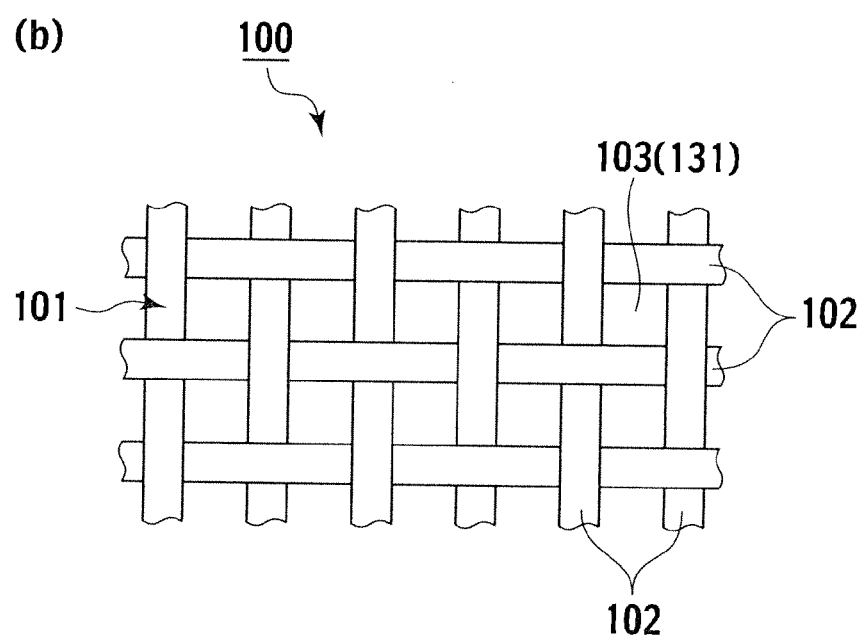

As shown in FIG. 1 and FIG. 2, the cathode electrode member 50c used in the cathode 60c in the present embodiment is composed of the plate member 100 having electrical conductivity provided with a large number of pores 131 and bent into a wave shape. The cathode electrode member 50c comes in direct contact with the cathode electrode catalyst layer 90c via the first contact portions 111, so as to ensure electrical conductivity between the cathode electrode member 50c and the cathode electrode catalyst layer 90c. Similarly, the cathode electrode member 50c comes in direct contact with the cathode separator 80c via the second contact portion 112, so as to ensure electrical conductivity between the cathode electrode member 50c and the cathode separator 80c.

In addition, the gas diffusion paths 121 of the cathode electrode member 50c are formed in such a manner that the plate member 100 having electrical conductivity provided with a large number of the pores 131 is bent into a wave shape. Therefore, even and regular first flow paths 122 and second flow paths 123 composed of the pores 131 can be obtained.

The cathode electrode member 50c having the above-described constitution achieves effects of decreasing a cell resistance and increasing a cell voltage while decreasing a pressure loss of reaction gas. In other words, since the gas diffusion paths 121 of the cathode electrode member 50c are even and regular paths compared to random paths in conventional porous foam metal, a pressure loss in the gas diffusion paths 121 is decreased. Therefore, a gas diffusion rate is not decreased, and oxidant gas is effectively diffused, so as to ensure a sufficient gas supply function. Then, an electrochemical reaction is promoted, and therefore, a high output power can be achieved. Moreover, since a gas diffusion rate is not decreased, generated water in the cathode 60c is easily brought downstream of a gas diffusion direction so as to be discharged. As a result, a flooding phenomenon that is an accumulation of generated water can be prevented effectively. This also contributes to promoting an electrochemical reaction, and achieving a high output power. Further, since a pressure loss of reaction gas is decreased, a flow rate distribution becomes uniform, so that voltage stability can be achieved.

As described above, the first contact portions 111 of the cathode electrode member 50c are in direct contact with the cathode electrode catalyst layer 90c, and the second contact portions 112 are in direct contact with the cathode separator 80c. Therefore, electrical conductivity between the cathode electrode catalyst layer 90c and the cathode separator 80c via the cathode electrode member 50c can be ensured. Thus, a cell resistance is decreased even though a gas diffusion layer such as a carbon paper is not provided. Accordingly, a current generated in the cathode electrode catalyst layer 90c can be easily supplied to the cathode separator 80c.

More specifically, in the conventional art, a gas diffusion layer consisting of a sheet-like material made of carbon woven fabric or nonwoven fabric and having electrical conductivity and porosity was required in order to ensure a gas diffusion property and electrical conductivity between the cathode electrode catalyst layer 90c and the cathode separator 80c. On the other hand, the cathode electrode member 50c of the present embodiment is directly interposed between the cathode electrode catalyst layer 90c and the cathode separator 80c, without providing the gas diffusion layer. Therefore, a gas diffusion property and electrical conductivity between the cathode electrode catalyst layer 90c and the cathode separator 80c can be ensured, and at the same time, a decrease in thickness of the MEA as a whole can be achieved.

The cathode electrode member 50c has a large amount of the fine pores 131 that face the portions in which the cathode electrode catalyst layer 90c comes in contact with the cathode electrode member 50c. Therefore, oxidant gas can be directly supplied to the cathode electrode catalyst layer 90c via the portions in which the cathode electrode catalyst layer 90c comes in contact with the cathode electrode member 50c. Thus, the whole surface of the cathode electrode catalyst layer 90c can be utilized evenly. As a result, a cell voltage can be increased.

Specifically, the gas diffusion paths 121 include the first flow paths 122 formed between the plate member 100 having a wave shape and the cathode electrode catalyst layer 90c and between the plate member 100 and the cathode separator 80c, and the second flow paths 123 formed by the pores 131. Due to the first flow paths 122 and the second flow paths 123, the even and regular flow paths can be provided, and therefore, a pressure loss of the gas diffusion paths 121 can be further decreased.

The first flow paths 122 extend in a direction perpendicular to a plane surface of FIG. 1(a), and extend in a diagonally left up direction in a plane surface of FIG. 2(a). The second flow paths 123 are formed in a normal direction of the plate member 100 having a wave shape. An arrow 125 in FIG. 2(a) shows a flow direction of oxidant gas in a space between the cathode electrode catalyst layer 90c and the cathode separator 80c. The flow direction of the oxidant gas is a direction from a manifold for supplying gas (not shown in the figure) toward a manifold for emitting gas (not shown in the figure).

The cathode electrode member 50c is preferably provided in such a manner that the first flow paths 122 are provided along the flow direction of the oxidant gas (the arrow 125 in FIG. 2(a)) in the space between the cathode electrode catalyst layer 90c and the cathode separator 80c. Therefore, since the extending direction of the first flow paths 122 is parallel to the flow direction of the oxidant gas, a pressure loss of the gas diffusion paths 121 can be decreased. As a result, the oxidant gas is effectively diffused, and therefore, an electrochemical reaction is promoted, and a high output power can be achieved. In addition, since a pressure loss of the gas diffusion paths 121 is decreased, a flooding phenomenon can be prevented more reliably.

It is to be noted that the state "the first flow paths 122 are provided along the flow direction of the oxidant gas" is not particularly limited to the case in which the gas flow direction and the extending direction of the first flow paths 122 are parallel to each other. In view of the comparison with random flow paths in porous foam metal, the gas flow direction may partially intersect with the extending direction of the first flow paths 122 as long as a pressure loss in the flow paths as a whole is decreased as much as possible. This represents a condition in which the electrode members 50a and 50c may be provided in such a manner that the first flow paths 122 are provided along the gas main flow direction.

The cathode electrode member 50c is preferably provided between the cathode electrode catalyst layer 90c and the cathode separator 80c in such a manner that the whole surface of the cathode electrode catalyst layer 90c is in contact with and covered with the cathode electrode member 50c. Due to such a configuration, a cell resistance is decreased, and therefore, a current generated in the cathode electrode catalyst layer 90c can be easily supplied to the cathode separator 80c. Note that, the cathode electrode member 50c may be partially provided on the surface of the cathode electrode catalyst layer 90c.

An electrical conductive material constituting the plate member 100 is not particularly limited, and an arbitrary material may be selected from constituent materials used for a metal separator. Examples of the constituent material for the plate member 100 include iron, titanium and aluminum, and an alloy of those metals. These materials are preferable in view of mechanical strength, a multiplicity of uses, cost performance, and processability. Here, an iron alloy includes stainless steel. Particularly, the plate member 100 is preferably made of stainless steel, aluminum or an aluminum alloy.

The plate member 100 preferably employs a metal mesh 101 as shown in FIG. 2(b). A dimension of the metal mesh 101 to be used may be determined arbitrarily. For example, a mesh count is between 100 and 500, a wire diameter is between 25 and 40 μm, and a pitch P is between 50 and 80 μm. A pattern of the metal mesh 101 is not particularly limited, and plain weave, twilled weave, plain dutch weave or twilled dutch weave may be used. In the metal mesh 101, mesh openings 103 between wire rods 102 intersecting each other correspond to the pores 131. The mesh count and the wire diameter may be measured according to JIS G3555. The pitch P may be obtained by measuring a distance between each vertex of adjacent convex portions as shown in FIG. 1(a) and FIG. 2(a).

The plate member 100 may employ other materials other than the metal mesh 101 as long as the materials are provided with the plurality of the pores 131, has electrical conductivity, and can be bent into a wave shape. For example, the plate member 100 may be made of punching metal, etching metal or expanded metal. Due to the use of those materials for the plate member 100, a large number of the fine pores 131 can be formed in the cathode electrode member 50c. Therefore, oxidant gas can be directly supplied to the cathode electrode catalyst layer 90c via the portions in contact with the cathode electrode catalyst layer 90c, as described above. Accordingly, the whole surface of the cathode electrode catalyst layer 90c can be utilized evenly, and a cell voltage can be increased.

In the case where the plate member 100 is made of the metal mesh 101, the mesh count of the metal mesh 101 is preferably 100 or more. Since a relatively large number of the mesh openings 103 can be provided, oxidant gas can be easily supplied to the whole surface of the cathode electrode catalyst layer 90c, and a cell voltage can be increased. In addition, since a pore diameter of the mesh openings 103 is relatively small, a contact area with the cathode electrode catalyst layer 90c and the cathode separator 80c per unit area is increased. Therefore, an electric resistance in the cell is decreased, and electrons generated in the anode electrode catalyst layer 90a are easily transferred to the cathode electrode catalyst layer 90c.

In the case where the plate member 100 is made of etching metal, an opening ratio is preferably 50% or more, and a pore diameter of the pores 131 is preferably 200 μm or less. Due to such a configuration, a cell voltage can be increased, and a cell resistance can be decreased in a similar manner to the above-described case. Also in the case where the plate member 100 is made of punching metal or expanded metal, the dimension and the pore diameter of the pores 131 are preferably determined in such a manner that the gas supply function and the current collecting function of the cathode electrode member 50c can be achieved adequately.

With regard to the bending processing of the plate member 100, the plate member 100 is preferably subjected to roll embossing, so as to be formed into a wave shape. This is because a cost for the roll embossing formation is relatively low, and the roll embossing process is suitable for mass production. A dimension of the wave shape may be determined arbitrarily. For example, the height h may be approximately 200 μm, and the wave pitch P may be approximately 200 μm (refer to FIG. 2(a)).

As described above, when the plate member 100 is formed into a wave shape, the plate member 100 is preferably subjected to bending processing in a regular manner. Accordingly, the first contact portions 111 of the cathode electrode member 50c can come into contact with the cathode electrode catalyst layer 90c evenly, and the second contact portions 112 can come into contact with the cathode separator 80c evenly. Furthermore, the first flow paths 122 of the gas diffusion paths 121 can be provided evenly between the plate member 100 and the cathode electrode catalyst layer 90c and between the plate member 100 and the cathode separator 80c.

Figure 3C:
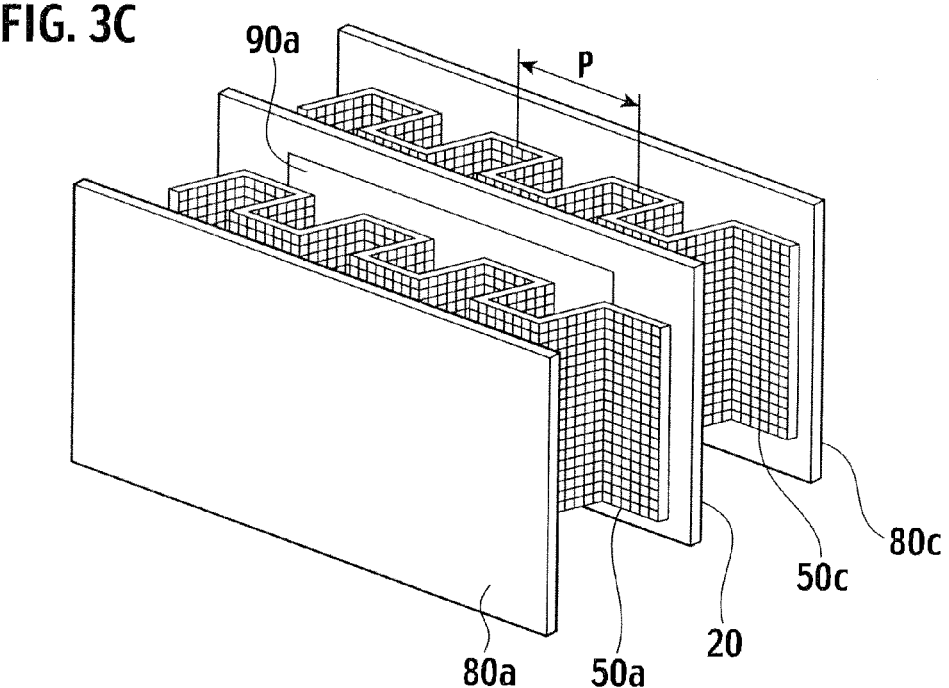
FIG. 3C is a view showing an example of a wave shape of an electrode member, and a schematic perspective view showing a PEFC including an electrode member having a rectangular wave shape.

The wave shape of the electrode members 50a and 50c is not particularly limited, and the electrode members 50a and 50c may be bent into an arbitrary shape as long as the shape can decrease a pressure loss, decrease a cell resistance, and have an effect of increasing a cell voltage. In other words, the electrode members 50a and 50c may be plate members that are bent continuously, and a cross-sectional shape thereof is not particularly limited. For example, the electrode members 50a and 50c may have a cross-section having a wave shape with a sine curve as shown in FIG. 2(a) and FIG. 3A. Alternatively, the electrode members 50a and 50c may have a cross-section having a continuous triangular wave shape as shown in FIG. 3B, or have a cross-section having a continuous approximately rectangular wave shape as shown in FIG. 3C. Although the anode electrode member 50a has the wave shape identical to the cathode electrode member 50c in FIGS. 3A to 3C, the electrode member having any of the above-described shapes may be used only in the cathode 60c as shown in FIG. 1, or may be used only in the anode 60a.

As shown in FIG. 1(b), the surface of the cathode electrode member 50c is preferably subjected to an electrically-conductive corrosion-resistant treatment. Due to the electrically-conductive corrosion-resistant treatment on the cathode electrode member 50c, the cathode electrode member 50c is not corroded, and durability of the cell can be improved.

With regard to the electrically-conductive corrosion-resistant treatment, gold or electrical conductive carbon is preferably used for a coating. As for the gold coating, gold plating may be used. Another example of the gold coating may be a gold-clad coating in which gold is provided on the surface of the plate member. As for the electrical conductive carbon coating, an electrical conductive carbon layer 140 is preferably provided on the surface of the plate member 100 as shown in FIG. 1(b). Thus, when the electrically-conductive corrosion-resistant treatment employs gold plating, the gold-clad coating or the electrical conductive carbon layer 140, the plate member 100 is not easily corroded under environmental conditions in the fuel cell. Therefore, durability of the cell can be improved.

The case where the electrically-conductive corrosion-resistant treatment is the provision of the electrical conductive carbon layer 140 will be explained in more detail. A crystal structure of the electrical conductive carbon layer 140 is not particularly limited as long as the crystal structure can ensure a corrosion resistance. However, when the crystal structure in the carbon layer varies, an anticorrosion property and electrical conductivity also vary associated with the variation of the crystal structure. Therefore, the control of the crystal structure of carbon contained in the electrical conductive carbon layer 140 is important in order to improve the anticorrosion property while sufficiently ensuring excellent electrical conductivity with regard to the electrical conductive carbon layer 140. Thus, an intensity ratio R ($I_D/I_G$) of a D-band peak intensity ($I_D$) to a G-band peak intensity ($I_G$) measured by a Raman scattering spectroscopic analysis in the electrical conductive carbon layer 140 is preferably 1.3 or more.

When a carbon material is analyzed by Raman spectroscopy, peaks usually appear in the vicinity of 1350 cm$^{-1}$ and 1584 cm$^{-1}$. High crystalline graphite has a single peak in the vicinity of 1584 cm$^{-1}$. This peak is usually referred to as "G-band". While, as crystallinity is lowered, in the other words, as a defect of the crystal structure is increased and the structure of graphite is disordered, a peak appears in the vicinity of 1350 cm$^{-1}$, which is usually referred to as "D-band". Note that, a peak of diamond is precisely 1333 cm$^{-1}$, which is distinct from the D-band. The intensity ratio R ($I_D/I_G$) of the D-band peak intensity ($I_D$) to the G-band peak intensity ($I_G$) is used as an index of a size of graphite clusters of the carbon material, a disordered level of the graphite structure (a defect of the crystal structure), and an sp$^2$ bond ratio. That is, in the present embodiment, the R value may be regarded as an index of a contact resistance of the electrical conductive carbon layer 140, and may be used as a film parameter for controlling electrical conductivity of the electrical conductive carbon layer 140.

In order to calculate the R ($I_D/I_G$) value, Raman spectrum of the carbon material is measured by use of a Micro-Raman spectroscope. Specifically, a relative intensity ratio (peak area ratio ($I_D/I_G$)) of the peak intensity ($I_D$) of 1300 to 1400 cm$^{-1}$ referred to as D-band to the peak intensity ($I_G$) of 1500 to 1600 cm$^{-1}$ referred to as G-band is calculated to obtain the R value.

As described above, the R value according to the present embodiment is preferably 1.3 or more. This R value is preferably between 1.4 and 2.0, more preferably between 1.4 and 1.9, even more preferably between 1.5 and 1.8. When the R value is 1.3 or more, the electrical conductive carbon layer 140 in which electrical conductivity in a stacking direction of the fuel cell is sufficiently ensured can be obtained. Moreover, when the R value is 2.0 or less, a reduction of a graphite component can be suppressed. In addition, an increase in inner stress of the electrical conductive carbon layer 140 itself can be also suppressed, so that adhesion to the plate member 100 as a base material can be further improved.

Examples of electrical conductive carbon in the electrical conductive carbon layer 140 include carbon black, graphite, fullerene, carbon nanotube, carbon nanofiber, carbon nanohorn, and carbon fibril. Specific examples of carbon black include Ketjen black, acetylene black, channel black, lamp black, oil furnace black, and thermal black. Carbon black may be subjected to a graphite treatment. The carbon materials may be used singly, or two or more of them may be combined. Moreover, the electrical conductive carbon layer 140 may be only composed of the electrical conductive carbon, or may contain a water-repellent agent or a hydrophilic agent, as described below.

With regard to a method for manufacturing the electrical conductive carbon layer 140, first, the surface of the plate member 100 made of iron, titanium, aluminum or the like is subjected to a degreasing and washing treatment by use of an appropriate solvent. Examples of the solvent include ethanol, ether, acetone, isopropyl alcohol, trichloroethylene, and a caustic alkali agent. Examples of the degreasing and washing treatment include ultrasonic cleaning. Then, an oxide film formed on the surface of the plate member 100 is removed. Examples of a method for removing the oxide film include a washing treatment by acid, a dissolution treatment by applying an electrical potential, and an ion bombardment treatment.

Using a target material made of electrical conductive carbon, the surface of the plate member 100 is covered with the electrical conductive carbon layer 140, so that the electrical conductive carbon layer 140 is provided thereon. In this case, a physical vapor deposition (PVD) method such as a sputtering method and an arc ion plating method, and an ion beam deposition method such as a filtered cathodic vacuum arc (FCVA) method are preferably used. Examples of the sputtering method include a magnetron sputtering method, an unbalanced magnetron sputtering (UBMS) method, and a dual magnetron sputtering method. Due to the use of those methods, the electrical conductive carbon layer 140 with a small content of hydrogen can be formed. As a result, a connection ratio between carbon atoms ($sp^2$) can be increased, and excellent electrical conductivity can be achieved.

As described above, the cathode electrode member 50c may be subjected to the water-repellent treatment. Due to the water-repellent treatment on the cathode electrode member 50c, water accumulated in the pores 131, between the spaces of the wave shape, or between the cathode electrode member 50c and the cathode separator 80c is decreased, so that an interruption of gas supply by water is prevented. In addition, since water flooding in the electrode member can be suppressed, oxidant gas is supplied to the cathode electrode catalyst layer 90c smoothly. Accordingly, a rapid decrease of a cell voltage is suppressed, and the cell voltage can be stabilized.

Examples of the method of the water-repellent treatment include a method of covering the cathode electrode member 50c with the water-repellent agent, and a method of including the water-repellent agent in the electrical conductive carbon layer 140. Examples of the water-repellent agent include, but not particularly limited to, a fluorinated polymer material such as polytetrafluoroethylene (PTFE), polyvinylidene fluoride (PVDF), polyhexafluoropropylene, and a tetrafluoroethylene-hexafluoropropylene copolymer (FEP), polypropylene, and polyethylene. The PTFE and PCDF have a resistance to deterioration under environmental conditions in the fuel cell. Therefore, water repellency of the cathode electrode member 50c is maintained so as to improve durability of the cell.

The cathode electrode member 50c may be subjected to the hydrophilic treatment instead of the water-repellent treatment. Due to the hydrophilic treatment on the cathode electrode member 50c, liquid water from the cathode electrode catalyst layer 90c is drawn to the flow path side, so that water to be held in the cathode electrode catalyst layer 90c can be reduced. As a result, a rapid decrease of a cell voltage is suppressed, and the cell voltage can be stabilized.

Examples of the method of the hydrophilic treatment include a method of covering the cathode electrode member 50c with the hydrophilic agent, and a method of including the hydrophilic agent in the electrical conductive carbon layer 140. Examples of the hydrophilic agent include, but not particularly limited to, a silane coupling agent and polyvinylpyrrolidone (PVP).

The cathode electrode member 50c may be subjected to both the hydrophilic treatment and the water-repellent treatment. That is, one surface of the plate member 100 may be subjected to the hydrophilic treatment, and the other surface may be subjected to the water-repellent treatment. In this case, the surface at the separator side of the plate member 100 is preferably subjected to the hydrophilic treatment, and the surface at the electrode catalyst layer side is preferably subjected to the water-repellent treatment.

(Protection Layer)

As shown in FIG. 1(a), the cathode electrode catalyst layer 90c preferably includes the electrical conductive protection layer 150, in addition to the catalyst component layer 30c. In the present embodiment, the protection layer 150 is a single layer, and is provided between the catalyst component layer 30c and the cathode electrode member 50c. Namely, since the protection layer 150 is interposed between the catalyst component layer 30c and the cathode electrode member 50c, a first surface 151 is in direct contact with the catalyst component layer 30c, and a second surface 152 is in direct contact with the first contact portions 111 of the cathode electrode member 50c. As a result, electrical conductivity between the catalyst component layer 30c and the cathode electrode member 50c is increased, so that a current collecting performance can be improved. Further, since the surface of the catalyst component layer 30c is covered with the protection layer 150, damage of the catalyst component layer 30c caused by pressure contacting of the cathode electrode member 50c made of metal can be prevented.

A material composing the protection layer 150 may be an arbitrary material as long as the material can ensure electrical conductivity between the catalyst component layer 30c and the cathode electrode member 50c and can prevent damage of the catalyst component layer 30c. For example, as the protection layer 150, a sheet-like body obtained in such a manner that a polytetrafluoroethylene porous body is impregnated with carbon particles, followed by baking may be used. Due to the sheet-like body, a manufacturing process becomes simple, and handling and assembling at the time of stacking each member of the PEFC 10 are easily performed.

When the pitch of the wave shape of the cathode electrode member 50c is P, and the total thickness of the protection layer 150 and the catalyst component layer 30c is t', the protection layer 150 is preferably provided so as to meet the condition of P<10t'. For example, when the thickness of the catalyst component layer 30c is 10 μm and the thickness of the protection layer 150 is 20 μm, the total thickness t' is 30 μm, and therefore, the pitch P is preferably P<300 μm. Due to the condition of P<10t', a current can be collected without using a carbon paper (gas diffusion layer).

When the contact area between the cathode electrode member 50c and the protection layer 150 is decreased as a result of slightly increasing the pitch P of the cathode electrode member 50c, the thickness t of the catalyst component layer 30c may be increased so as to meet the condition of P<10t'. Even if the pitch P is increased, a current can be collected sufficiently since the thickness t of the catalyst component layer 30c is increased and an electric resistance in a horizontal direction of the catalyst component layer 30c is decreased. In addition, since a carbon paper manufactured at a relatively high cost and by a complicate process is not required, a manufacturing cost of the cathode 60c can be reduced. Further, since the carbon layer is not required, a size in a thickness direction can be also reduced.

As described above, the pitch P of the electrode member may be obtained by measuring the distance between each vertex of the adjacent convex portions. Namely, in the case of the wave shape with a sine curve as shown in FIG. 2(a) and FIG. 3A, and the continuous triangular wave shape as shown in FIG. 3B, the distance between each vertex of the adjacent convex portions in contact with the cathode separator 80c or the cathode electrode catalyst layer 90c is to be the pitch P. In the case of the continuous approximately rectangular wave shape as shown in FIG. 3C, the distance between each center of the adjacent convex portions in contact with the cathode separator 80c or the cathode electrode catalyst layer 90c is to be the pitch P.

(Carbon Particle Layer)

As shown in FIG. 1(a), a carbon particle layer 160 may be provided between the anode catalyst component layer 30a and the anode gas diffusion layer 40a. The carbon particle layer (microporous layer) is provided on the anode catalyst component layer 30a by pressure bonding in order to improve current collectivity.

The carbon particle layer may be prepared in such a manner that a PTFE porous body is impregnated with an aqueous dispersion consisting of acetylene black, PTFE fine particles and a thickening agent, followed by a baking treatment.

(Separator)

The separators 80a and 80c have a function to electrically series-connect a plurality of the single cells to each other when connecting the single cells in series to constitute the fuel cell stack. In addition, the separators 80a and 80c have a function as a partition to prevent fuel gas, oxidant gas and a coolant from being in contact with each other.

As for the material constituting the separators 80a and 80c, a conventionally known material, for example, carbon such as dense carbon graphite and a carbon plate and metal such as stainless steel, may be appropriately used. In the present embodiment, the anode separator 80a and the cathode separator 80c are both made of carbon.

The anode separator 80a includes grooved ribs 81 as flow paths for fuel gas. On the other hand, the cathode separator 80c has a flat surface 82 with which the second contact portions 112 of the cathode electrode member 50c are in contact. In other words, there is no necessity to form ribs in the cathode separator 80c since a sufficient gas supply function can be ensured due to the cathode electrode member 50c. Therefore, the cathode separator 80c can be manufactured by a simple process and at a low cost. More specifically, a separator made of carbon requires ribs to be formed by cutting processing, and a separator made of metal requires ribs to be formed by pressing processing. However, since there is no necessity to form ribs in the cathode separator 80c according to the present embodiment, a reduction in cost can be achieved. Further, since ribs are not required in the cathode separator 80c, the size in a thickness direction of the cathode separator 80c and further the size in a thickness direction of the PEFC 10 can be reduced.

(Polymer Electrolyte Membrane)

The polymer electrolyte membrane 20 has a function to selectively transmit protons generated in the anode catalyst component layer 30a during the operation of the PEFC 10 to the cathode catalyst component layer 30c along a film thickness direction. In addition, the polymer electrolyte membrane 20 has a function as a partition to prevent fuel gas supplied to the anode 60a and oxidant gas supplied to the cathode 60c from being mixed together.

A specific configuration of the polymer electrolyte membrane 20 is not particularly limited, and a conventionally known film in the art of a fuel cell made of a polymer electrolyte may be appropriately applied. As for the polymer electrolyte membrane 20, a fluorinated polymer electrolyte membrane consisting of a perfluorocarbon sulfonic acid polymer such as Nafion (registered trademark, manufactured by DuPont Kabushiki Kaisha), Aciplex (registered trademark, manufactured by Asahi Kasei Corporation), and Flemion (registered trademark, manufactured by Asahi Glass Co., Ltd.) may be used.

(Catalyst Component Layer)

The catalyst component layer (anode catalyst component layer 30a, cathode catalyst component layer 30c) is a layer in which a cell reaction actually proceeds. More specifically, an oxidation reaction of hydrogen proceeds in the anode catalyst component layer 30a, and a reduction reaction of oxygen proceeds in the cathode catalyst component layer 30c. The catalyst component layer contains a catalyst component, an electrical conductive catalyst carrier that supports the catalyst component, and a polymer electrolyte.

The catalyst component used for the anode catalyst component layer 30a is not particularly limited as long as the catalyst component has a catalytic action with respect to the oxidation reaction of hydrogen, and a well-known catalyst may be used. Similarly, the catalyst component used for the cathode catalyst component layer 30c is not particularly limited as long as the catalyst component has a catalytic action with respect to the reduction reaction of oxygen, and a well-known catalyst may be used. Specific examples of the catalyst component include metal such as platinum, ruthenium, iridium, rhodium, palladium, osmium, tungsten, lead, iron, chromium, cobalt, nickel, manganese, vanadium, molybdenum, gallium and aluminum, and an alloy of these metals. Among these, the catalyst component preferably contains at least platinum in order to improve a catalytic activity, a resistance to carbon monoxide and a resistance to heat.

The catalyst carrier functions as a carrier to support the catalyst component, and functions as an electron conductive path used for an electron communication between the catalyst component and other members. The catalyst carrier is not particularly limited as long as the catalyst carrier has a specific surface area sufficient to support the catalyst component in a desired dispersed state, and has sufficient electron conductivity. The catalyst carrier preferably contains carbon as a main component. Specific examples of the catalyst carrier include carbon black, active carbon, coke, and carbon particles consisting of natural graphite and artificial graphite.

The polymer electrolyte is not particularly limited. For example, ion exchange resin constituting the above-described electrolyte layer may be used.

(Gas Diffusion Layer)

The anode gas diffusion layer 40a has a function to promote diffusion of fuel gas supplied via the ribs 81 of the anode separator 80a to the anode catalyst component layer 30a, and has a function as an electron conductive path.

A material consisting of a substrate of the anode gas diffusion layer 40a is not particularly limited, and conventionally known findings are appropriately applied. For example, a sheet-like material having electrical conductivity and porosity such as fabric made of carbon, finished paper, felt and nonwoven fabric may be used. Although a thickness of the substrate may be determined according to the characteristics of the anode gas diffusion layer 40a, the thickness may be approximately 30 to 500 μm. When the thickness of the substrate is within such a range, a balance between a mechanical strength and dispersivity of gas and water is controlled appropriately.

The anode gas diffusion layer 40a preferably contains a water-repellent agent in order to enhance water-repellency and prevent a flooding phenomenon. For example, the water-repellent agent may be, but not particularly limited to, polytetrafluoroethylene (PTFE).

A method for manufacturing the fuel cell is not particularly limited, and conventionally known findings in the art of the fuel cell may be appropriately applied. A fuel used during the operation of the fuel cell is not particularly limited. For example, hydrogen, methanol, ethanol, 1-propanol, 2-propanol, primary butanol, secondary butanol, tertiary butanol, dimethyl ether, diethyl ether, ethylene glycol and diethylene glycol are used. Particularly, hydrogen and methanol are preferably used in terms of having a high output property.

In order to ensure a desired voltage for the fuel cell, a fuel cell stack having a structure in which a plurality of membrane electrode assemblies 70 are stacked and connected in series via the separators 80a and 80c may be formed. A shape of the fuel cell is not particularly limited, and may be arbitrarily determined in such a manner that a battery property such as a desired voltage can be obtained.

Figure 4:
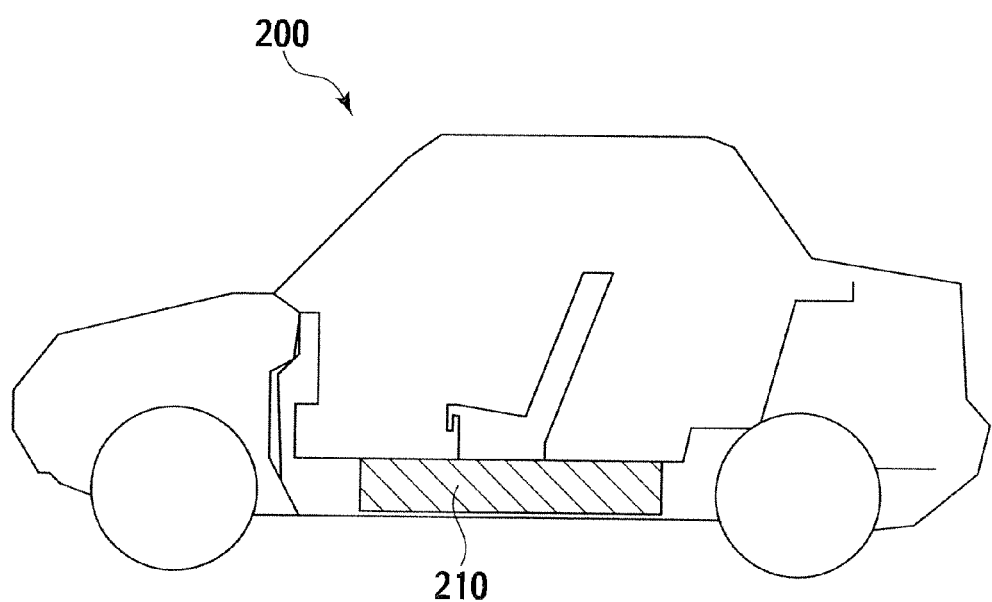
FIG. 4 is a schematic view showing a vehicle installed with a fuel cell stack.

The PEFC 10 according to the present embodiment and the fuel cell stack using the PEFC 10 may be installed in a vehicle as a driving power source. As shown in FIG. 4, when a fuel cell stack 210 is installed in a fuel cell vehicle 200, the fuel cell stack 210 may be installed under seats in the middle portion of a vehicle body of the fuel cell vehicle 200. Due to the installation of the fuel cell stack 210 under the seats, wide space inside the vehicle and in a trunk can be obtained. Depending on the circumstances, the fuel cell stack 210 may be installed under a rear trunk or a front engine room of the vehicle 200, other than the installation under the seats. The PEFC 10 and the fuel cell stack 210 described above have an excellent output property and durability. Therefore, the vehicle installed with the fuel cell with high reliability for a long period of time can be provided.

Modified Example

The present embodiment has been described with regard to the electrode member that is applied only to the cathode 60c; however, the present invention is not limited to this case. As shown in FIGS. 3A to 3C, the anode electrode member 50a having a similar constitution to the cathode electrode member 50c may be used instead of the anode gas diffusion layer 40a. Alternatively, the electrode member 50a may be applied only to the anode 60a, and a common gas diffusion layer may be applied to the cathode 60c, contrary to the embodiment shown in FIG. 1.

In addition, the present embodiment has been described with regard to the cathode electrode member 50c composed of the plate member 100 bent in a regular manner and provided with a large number of the pores 131 formed therein uniformly; however, the present invention is not limited to this case. For example, the electrode members 50a and 50c may be composed of the plate member 100 in which the opening ratio of the pores 131 is partly changed and the pitch of the wave shape is partly changed. Alternatively, several types of the plate members 100 having different opening ratios of the pores 131 and different pitches of the wave shape may be arranged in parallel, so as to constitute the electrode members 50a and 50c as one electrode member. According to the electrode members 50a and 50c having such a configuration, the airflow resistance can be partly changed, and the contact areas between the electrode members 50a and 50c and the catalyst component layers 30a and 30c or the separators 80a and 80c can be partly changed. At the time of constituting the fuel cell stack, a plurality of the MEAs 70 are stacked and pressed evenly via the separators 80a and 80c. Therefore, the electrode members 50a and 50c may be composed of the plate member 100 in which a height h of the wave shape is partly changed.

As shown in FIGS. 3A to 3C, when the anode 60a and the cathode 60c include the electrode members 50a and 50c, respectively, the anode electrode member 50a and the cathode electrode member 50c do not necessarily have the identical constitution. The plate members having different wave shapes and pitches thereof may be appropriately used.

The cathode separator 80c shown in the figure has a flat surface with which the second contact portions 112 of the cathode electrode member 50c come in contact. However, the present invention does not exclude a separator having ribs. The electrode members 50a and 50c may be in contact with the separators having ribs without any problem.

Figure 5:
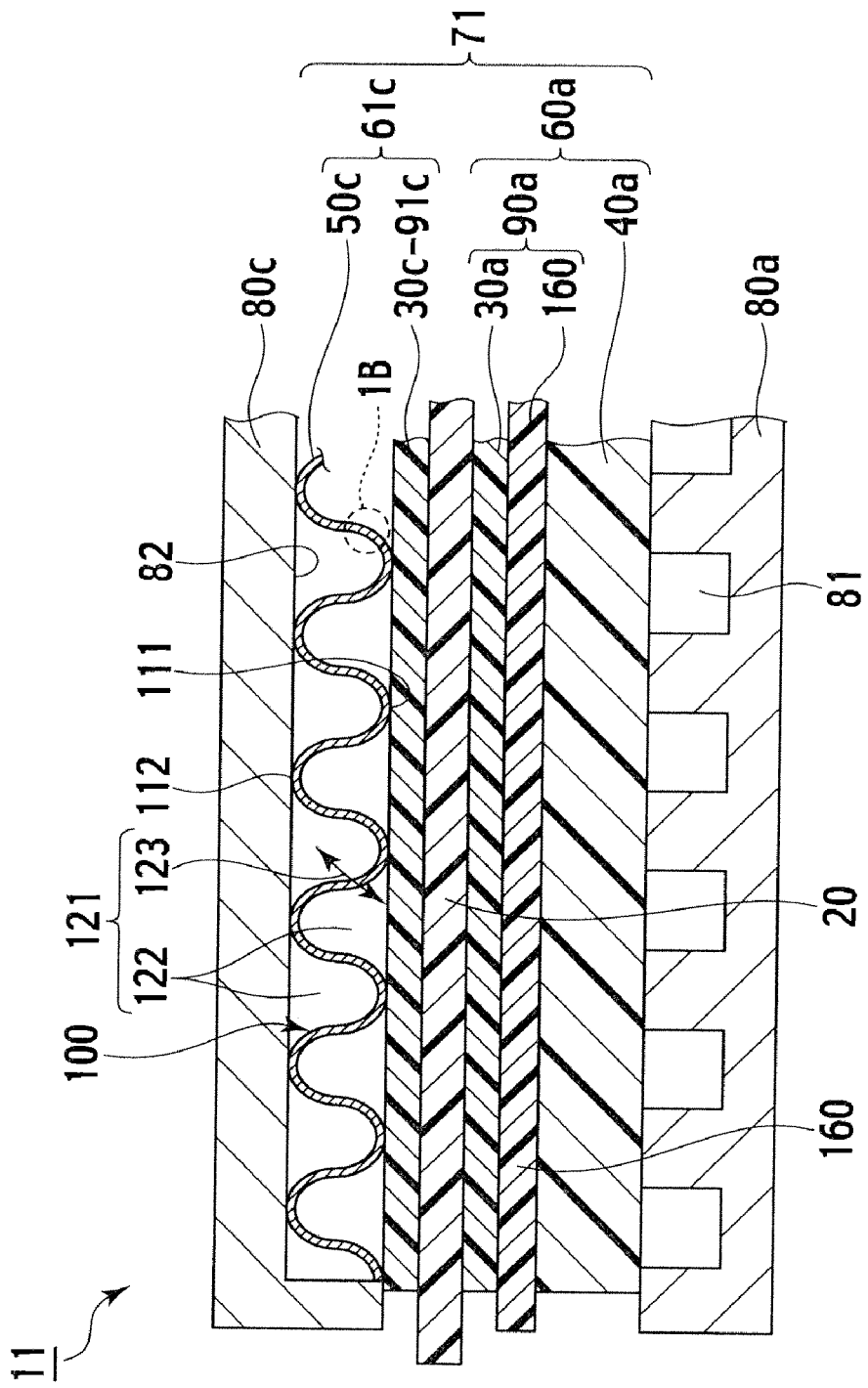
FIG. 5 is a schematic cross-sectional view showing a constitution of a polymer electrolyte fuel cell of FIG. 1(a) excluding a protection layer.

The electrode catalyst layer 90c in the PEFC 10 shown in FIG. 1(a) includes the catalyst component layer 30c and the protection layer 150. The first contact portions 111 of the cathode electrode member 50c are in direct contact with the second surface 152 of the protection layer 150. However, the PEFC according to the present embodiment is not necessarily provided with the protection layer 150 as shown in FIG. 5. Namely, an electrode catalyst layer 91c in a PEFC 11 in FIG. 5 includes the catalyst component layer 30c containing the catalyst component. In addition, the first contact portions 111 of the cathode electrode member 50c are in direct contact with the catalyst component layer 30c.

The protection layer 150 having electrical conductivity has a function to prevent damage of the catalyst component layer 30c and improve electrical conductivity between the catalyst component layer 30c and the cathode electrode member 50c. However, the protection layer 150 is not necessarily provided as long as the catalyst component layer 30c itself can ensure high electrical conductivity while having a sufficient intensity. When the protection layer is not provided, a thickness of a cathode 61c can be reduced, and therefore, a membrane electrode assembly 71 can be downsized.

When viewed from a stretching direction of the first flow paths 122, a central distance between the adjacent points at which the cathode electrode member 50c comes into contact with the cathode catalyst component layer 30c, that is, a pitch of the wave shape of the cathode electrode member 50c in FIG. 5 is to be P, and a thickness of the cathode catalyst component layer 30c is to be t. In this case, the relation between the central distance P and the thickness t preferably meets the condition of P<50t. For example, when the thickness t of the cathode catalyst component layer 30c is 10 μm, the pitch P is preferably P<500 μm. When porous foam metal is used, a carbon paper is required in order to improve current collectivity since a fine pore diameter is relatively large. However, when the relation between the central distance P and the thickness t meets P<50t, a current can be collected effectively without using a carbon paper (gas diffusion layer).

When the pitch P of the wave shape of the cathode electrode member 50c is smaller, the cross-sectional area of the first flow paths 122 is decreased although current collectivity is improved since the contact area between the cathode electrode member 50c and the cathode catalyst component layer 30c is increased. As a result, reaction gas may not to be easily diffused. Although a slight increase of the pitch P of the cathode electrode member 50c allows reaction gas to be easily diffused, the contact area between the cathode electrode member 50c and the cathode catalyst component layer 30c is decreased. In such a case, the thickness t of the cathode catalyst component layer 30c is preferably increased so as to meet P<50t. Accordingly, an electric resistance in a horizontal direction of the cathode catalyst component layer 30c is decreased since the thickness t of the cathode catalyst component layer 30c is increased. Thus, a current can be collected effectively even if the pitch P is increased. In addition, since a carbon paper (gas diffusion layer) manufactured at a relatively high cost and by a complicate process is not required when the electrode member is used, a manufacturing cost of the cathode 60c can be reduced. Further, since the carbon paper is not required, a size in a thickness direction can be also reduced.

Second Embodiment

An explanation will be made below in detail of the polymer electrolyte fuel cell according to the second embodiment of the present invention with reference to the drawings. The components identical to the first embodiment are indicated by the identical reference numerals, and the explanations thereof will not be repeated.

Figure 6:
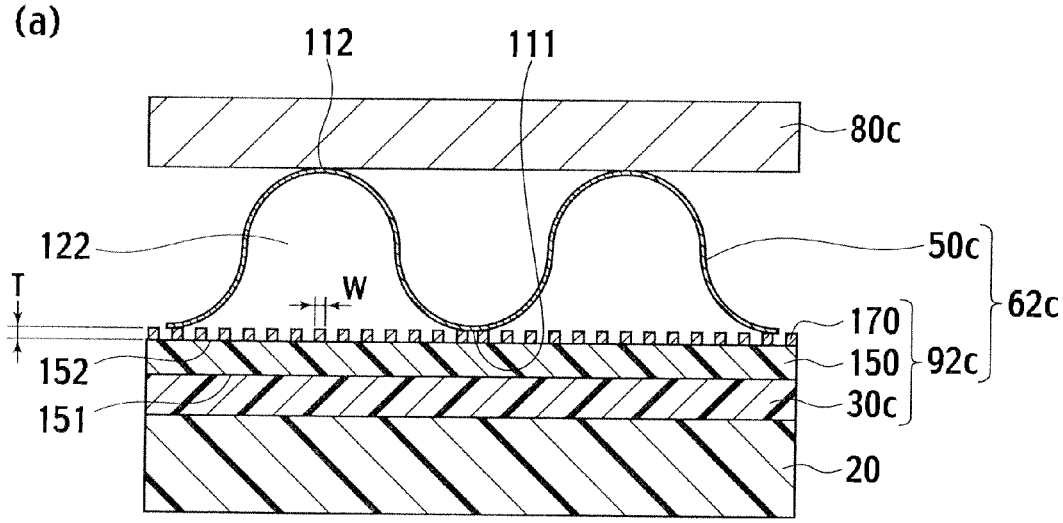
FIG. 6 is a schematic cross-sectional view showing one example of a polymer electrolyte fuel cell according to a second embodiment of the present invention.
Figure 6:
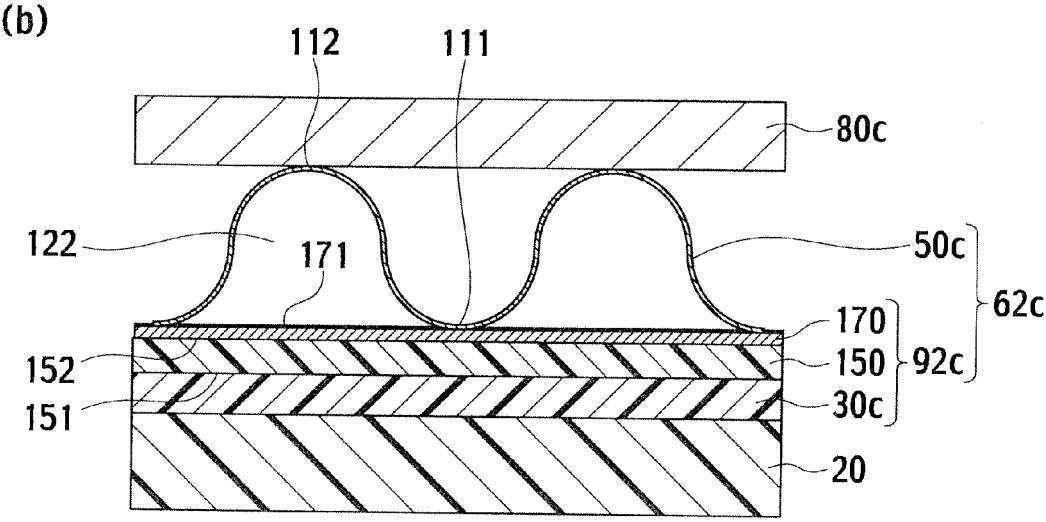

As shown in FIG. 6, the polymer electrolyte fuel cell according to the present embodiment includes the cathode catalyst component layer 30c provided on one surface of the polymer electrolyte membrane 20, the protection layer 150 formed on another surface of the cathode catalyst component layer 30c, and the cathode separator 80c having electrical conductivity for shielding gas, in a similar manner to the first embodiment. In addition, the electrode member 50c constituting a cathode 62c together with a cathode electrode catalyst layer 92c is provided between the cathode electrode catalyst layer 92c and the cathode separator 80c.

In addition, the polymer electrolyte fuel cell of the present embodiment is provided with a conductor 170 between the protection layer 150 and the electrode member 50c. In other words, the cathode electrode catalyst layer 92c of the present embodiment includes the conductor 170 provided on the surface of the protection layer 150 to electrically connect the protection layer 150 to the electrode member 50c, in addition to the cathode catalyst component layer 30c and the protection layer 150.

In the first embodiment described above, the first contact portions of the electrode member are in direct contact with the protection layer or the catalyst component layer of the electrode catalyst layer. Such a configuration may allow an electric resistance between the electrode member and the electrode catalyst layer to be sufficiently decreased, and allow a cell voltage to be increased. However, the present embodiment is characterized by the provision of the conductor in order to further decrease an electric resistance between the electrode member and the electrode catalyst layer. Due to such a configuration, electrons generated in the anode electrode catalyst layer 90a are easily transferred to the protection layer 150 and the cathode catalyst component layer 30c via the anode separator 80a, an external load, the cathode separator 80c, the electrode member 50c and the conductor 170. Further, due to the provision of the conductor 170 on the surface of the protection layer 150, conductivity in a surface direction (horizontal direction) of the protection layer 150 is improved. Accordingly, an interface resistance between the protection layer 150 and the electrode member 50c can be decreased by a simple configuration, and an increase of a cell voltage can be achieved.

The conductor 170 of the present embodiment preferably has higher electrical conductivity than the protection layer 150. This configuration allows an interface resistance between the electrode member 50c and the protection layer 150 to be further decreased, so that electrons can be smoothly transferred from the electrode member 50c to the protection layer 150.

Figure 7:
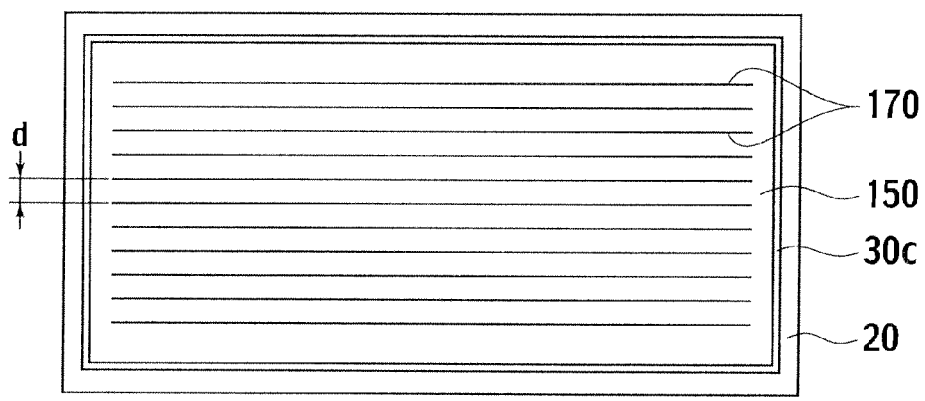
FIG. 7 is a plan view showing one example of an arrangement of a conductor.

As shown in FIGS. 6 and 7, the conductor 170 is preferably composed of a plurality of linear electrical conductive members. When the conductor 170 is composed of the linear electrical conductive members, oxidant gas can be effectively supplied from the first flow paths 122 to the protection layer 150 and the cathode catalyst component layer 30c while electron conductive paths are formed. As described below, the conductor 170 of the present embodiment has low gas permeability since the conductor 170 is made of transition metal or electrical conductive carbon. Therefore, when the conductor 170 is formed on the whole surface of the protection layer 150, oxidant gas is not sufficiently supplied to the cathode catalyst component layer 30c. As a result, a cell voltage may be decreased. However, the conductor 170 composed of the linear electrical conductive members can ensure sufficient gas permeability. It is to be noted that the configuration of the conductor 170 is not limited to the linear shape, and the conductor 170 may have any configurations as long as the conductor 170 can supply oxidant gas to the protection layer 150 and the cathode catalyst component layer 30c. For example, the conductor 170 may have a netlike structure.

When the conductor 170 is composed of the linear electrical conductive members, the electrical conductive members may be provided along a longitudinal direction of the protection layer 150 as shown in FIG. 7, or may be provided along a transverse direction of the protection layer 150. A distance d between the adjacent linear electrical conductive members may be arbitrarily determined as long as the supply of oxidant gas is not inhibited while good electrical conductivity can be ensured. For example, the distance d may be 100 μm. In addition, a thickness T and a width W of the linear electrical conductive members shown in FIG. 6 may be also arbitrarily determined as long as good electrical conductivity can be ensured. For example, the thickness T may be 1 μm, and the width W may be 10 μm.

Moreover, when the conductor 170 is composed of the linear electrical conductive members, the linear electrical conductive members are preferably provided parallel to or perpendicular to the first flow paths 122 of the electrode member 50c. In FIGS. 6(a) and 6(b), a flow direction of the first flow paths 122 of the electrode member 50c extends in a direction perpendicular to a plane surface of the figure. The conductor 170 is preferably provided parallel to the flow direction of the first flow paths 122. Alternatively, the conductor 170 is preferably provided perpendicular to the flow direction of the first flow paths 122 as shown in FIG. 6(b). Accordingly, only minimum electrical conductive paths are formed on the protection layer 150. Therefore, the supply of oxidant gas from the first flow paths 122 to the protection layer 150 and the cathode catalyst component layer 30c is not inhibited, so that a decrease in cell voltage can be prevented. In addition, when the conductor 170 is provided perpendicular to the flow direction of the first flow paths 122 as shown in FIG. 6(b), electrical conductivity between the adjacent first contact portions 111 can be ensured. Thus, electrons are more easily transferred to the protection layer 150. The arrangement of the conductor 170 is not limited to the examples shown in FIGS. 6(a) and 6(b). That is, when the first flow paths 122 of the electrode member 50c are formed in a curved shape, the conductor 170 may be provided so as to be along the curved shape of the first flow paths 122.

The conductor 170 preferably contains at least one of transition metal and the electrical conductive carbon. A large amount of current passes through transition metal and electrical conductive carbon since transition metal and electrical conductive carbon have high electrical conductivity, and those materials are hardly corroded even under environmental conditions of the fuel cell. Therefore, an interface resistance between the electrode member 50c and the protection layer 150 can be decreased. Further, since electrical conductive carbon is less expensive, a manufacturing cost of the fuel cell can be reduced. The conductor 170 may be made only of transition metal or electrical conductive carbon, or may contain a binder to bind particles of transition metal or electrical conductive carbon. Alternatively, the conductor 170 may contain other electrical conductive materials in addition to transition metal or electrical conductive carbon.

Examples of transition metal used for the conductor 170 include gold, silver and copper. Those metals have high electrical conductivity, and are hardly corroded even in the fuel cell. As described below, those metals have good processability since the conductor can be formed by plating or edging. Moreover, when silver or copper is used to form the conductor as a main component among those transition metals, a reduction in cost can be achieved.

In addition, an electrical conductive paste composed of the above-mentioned transition metal and resin may be used as a material for the conductor 170. More specifically, an electrical conductive silver paste in which silver and resin are mixed may be used. In the electrical conductive paste, particles of the transition metal are coated with resin. Therefore, corrosion of the transition metal particles can be prevented, so that electrical conductivity can be ensured for a long period of time. Furthermore, since the conductor 170 can be formed by a printing technique by used of the electrical conductive paste, a manufacturing cost can be reduced.

In addition, as for the electrical conductive carbon used for the conductor 170, the electrical conductive carbon used for the electrical conductive carbon layer 140 described in the first embodiment may be used. A crystal structure of the electrical conductive carbon of the present embodiment may be also the same crystal structure as the electrical conductive carbon layer 140. However, an arbitrary crystal structure may be employed as long as the crystal structure has electrical conductivity and a resistance to corrosion. Further, electrical conductive diamond-like carbon (DLC) may be also used as the electrical conductive carbon for the conductor 170.

As shown in FIG. 7, the surface of the conductor 170, namely, the surface in contact with the first contact portions 111 of the electrode member 50c may be plated with a gold plating 171. More specifically, when the conductor 170 is made of copper, the surface of copper may be plated with gold. Due to such a plating treatment, electrical conductivity is improved, thereby further decreasing a contact resistance between the electrode member 50c and the conductor 170. When the surface the conductor 170 is plated with gold, corrosion of the conductor can be also prevented. When the entire conductor 170 is made of noble metal, the cost should be increased. However, when the conductor 170 is made of copper, and the surface thereof is plated with gold, the amount of noble metal to be used can be reduced, and therefore, a reduction in cost can be achieved The following is an explanation of a method for manufacturing the conductor 170. When the conductor 170 is made of transition metal, a thin film of transition metal is placed on the protection layer 150, followed by edging, thereby forming the conductor 170 having the above-described configuration. With regard to gold plating on the conductor, a well-known method may be employed.

When the electrical conductive paste is used, the conductor 170 may be formed by printing. Particularly, the protection layer 150 is coated with the electrical conductive paste by a screen printing method so as to form the conductor. Since the conductor can be stably formed at high speed when using a printing method, a manufacturing cost can be reduced.

Figure 8:
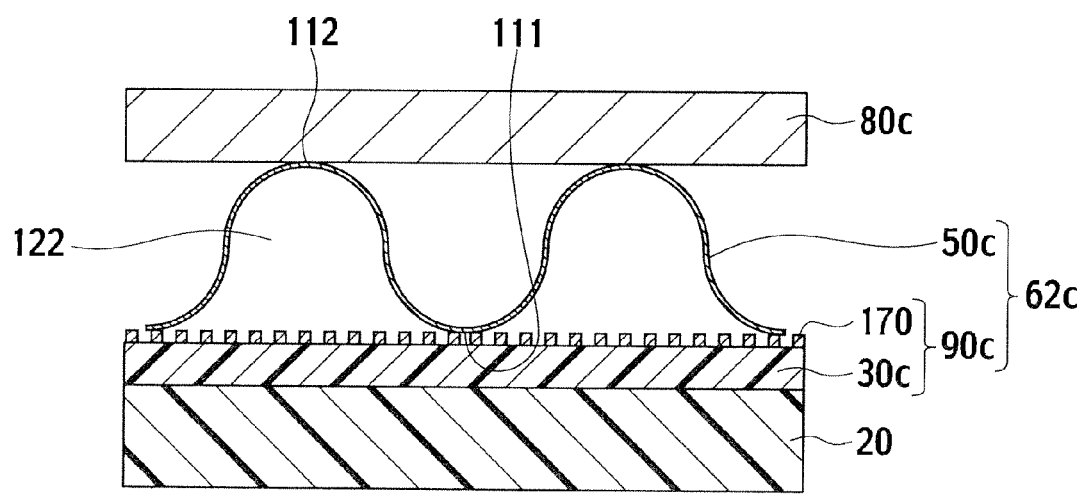
FIG. 8 is a schematic cross-sectional view showing another example of the polymer electrolyte fuel cell according to the second embodiment of the present invention.

Although the present embodiment has been described in the case where the conductor 170 is provided in the cathode 62c, the electrode member 50a may be provided in the anode, and the conductor may be further provided in the anode. Thus, a contact resistance in the anode can be decreased. Alternatively, the conductor 170 may be formed to come in direct contact with the surface of the catalyst component layer 30c without providing the protection layer on the catalyst component layer 30c, as shown in FIG. 8. Due to such a configuration, electrical conductivity between the electrode member 50c and the catalyst component layer 30c can be increased while the thickness of the electrode is reduced.

The following is an explanation of the effect according to the present invention with reference to an example and a comparative example. However, the scope of the present invention is not limited to the example.

Example

Nafion CS (registered trademark, manufactured by DuPont Kabushiki Kaisha) was used as a polymer electrolyte membrane. A Teflon (registered trademark) sheet coated with platinum-supported carbon (TEC10E50E, platinum content: 50% by mass, manufactured by Tanaka Kikinzoku Kogyo K.K.) was applied to both sides of the electrolyte membrane by a hot pressing method, so as to prepare an anode catalyst component layer and a cathode catalyst component layer. The amount of a platinum catalyst to be used in the anode catalyst component layer and the cathode catalyst component layer, respectively, was 0.4 mg/cm$^2$.

Next, a carbon particle layer and a protection layer were pressure-bonded on the anode catalyst component layer and the cathode catalyst component layer, respectively, in order to improve protection and current collectivity of the anode catalyst component layer and the cathode catalyst component layer. Thus, an assembly of the polymer electrolyte membrane, the anode catalyst component layer, the cathode catalyst component layer, the carbon particle layer and the protection layer was prepared. The carbon particle layer and the protection layer were obtained in such a manner that Poreflon (registered trademark, Sumitomo Electric Industries, Ltd.), which is a porous body of PEFE, was impregnated with an aqueous dispersion consisting of acetylene black (manufactured by Denki Kagaku Kogyo K.K.), Polyflon (registered trademark, manufactured by Daikin Industries, Ltd.), which is fine particles of PTFE, and the appropriate amount of a thickening agent, followed by baking at 350° C. for 30 minutes.

Further, a stainless mesh with a mesh count of 500 (twilled weave, wire diameter of 25 μm, aperture of 26 μm) was subjected to bending processing by an embossing roll, so as to form a plate member having a wave shape with a groove depth of 200 μm and a pitch of 200 μm. Then, the plate member was subjected to gold plating with a thickness of 100 μm, thereby preparing an electrode member.

The electrode member was provided on the carbon particle layer and the protection layer, respectively, followed by interposing between a pair of separators, so as to form a single cell for an evaluation test. As for the separators, cut carbon (manufactured by Mechanical Carbon Industry Co., Ltd.) was used. The separators had a planar shape without ribs. As shown in FIG. 3A, the PEFC of this example includes the anode and the cathode that are both composed of an electrode catalyst layer and an electrode member, respectively, without using a gas diffusion layer made of carbon paper, carbon nonwoven fabric or carbon fiber.

Comparative Example

An assembly of a polymer electrolyte membrane, an electrode catalyst layer, a carbon particle layer and a protection layer was prepared in the same manner as the example.

Next, a gas diffusion layer made of carbon fiber (manufactured by Toray Industries Inc.) was pressure-bonded on the carbon particle layer and the protection layer, respectively, followed by interposing between a pair of separators, so as to form a single cell for an evaluation test in the comparative example. As for the separators, cut carbon (manufactured by Mechanical Carbon Industry Co., Ltd.) was used. The separators had ribs (gas diffusion paths). A width of the ribs is 1 mm, and a depth of the flow paths is 1 mm).

(Evaluation)

Each single cell for the evaluation test of the example and the comparative example was subjected to a power generation test. Hydrogen was supplied to the anode, and air was supplied to the cathode. A relative humidity was set to 100% RH in the anode and 100% RH in the cathode, respectively. Further, a cell temperature was set to 70° C., and a supplied pressure of hydrogen and air was set to an atmospheric pressure.

The evaluation result is shown in FIG. 9. As shown in FIG. 9, under the high humidified condition in which flooding tends to be easily caused, the cell using the electrode member in the example had a high cell pressure even at high current density due to a low cell resistance, and ensured good performance without causing a flooding phenomenon. On the other hand, in the cell using the gas diffusion layer in the comparative example, a cell voltage was significantly decreased because of a flooding phenomenon assumed to be caused under the ribs.

As described above, it is recognized that the fuel cell using the electrode member can maintain a high voltage and ensure good performance without causing flooding even at high current density, compared to the conventional cell using the gas diffusion layer.

The entire content of Japanese Patent Application No. P2008-305002 (filed on Nov. 28, 2008) is herein incorporated by reference.

Although the present invention has been described above by reference to the embodiments and the example, the present invention is not limited to those, and it will be apparent to these skilled in the art that various modifications and improvements can be made.

INDUSTRIAL APPLICABILITY

The electrode member according to the present invention is composed of an electrical conductive plate member provided with a large number of pores and bent into a wave shape. Therefore, the gas diffusion paths are formed evenly in a regular manner, and a pressure loss of the gas diffusion paths is decreased. Thus, gas can be effectively dispersed, and a sufficient gas supply function can be ensured. As a result of the promotion of an electrochemical reaction, a high output power can be achieved. In addition, since electrical conductivity between the electrode catalyst layer and the separator via the electrode member can be ensured, a cell resistance is decreased. Further, gas can be supplied directly to the electrode catalyst layer via the portions where the electrode member is in contact with the electrode catalyst layer due to the pores. Accordingly, the whole surface of the electrode catalyst layer can be evenly utilized, and a cell voltage can be increased.

In a conventional polymer electrolyte fuel cell, in order to ensure a gas diffusion property and electrical conductivity between the electrode catalyst layer and the separator, a gas diffusion layer consisting of a sheet-like material made of carbon woven fabric or nonwoven fabric and having electrical conductivity and porosity was required. On the other hand, in the present invention, the electrode member is directly interposed between the electrode catalyst layer and the separator without providing the gas diffusion layer. Therefore, a decrease in thickness of the MEA as a whole can be achieved while a gas diffusion property and electrical conductivity between the electrode catalyst layer and the separator are ensured.

In a conventional gas diffusion layer, a sheet-like substrate using carbon fiber or the like having high electrical conductivity subjected to a graphitizing treatment is used. However, when carbon fiber is subjected to the graphitizing treatment, a high temperature of 2000° C. or more is required. As a result, a cost is substantially increased. On the other hand, since the present invention uses the less expensive electrode member instead of an expensive gas diffusion layer, a reduction in cost can be achieved.

REFERENCE SIGNS LIST

10 Polymer electrolyte fuel cell
20 Polymer electrolyte membrane
50c Cathode electrode member
80c Cathode separator
90c Cathode electrode catalyst layer
100 Plate member
111 First contact portion
112 Second contact portion
121 Gas diffusion path

The invention claimed is:

1. A polymer electrolyte fuel cell, comprising:
 a polymer electrolyte membrane;
 an electrode catalyst layer provided on one surface of the polymer electrolyte membrane;
 a separator having electrical conductivity, and shielding gas; and
 an electrode member interposed between the electrode catalyst layer and the separator and constituting an electrode together with the electrode catalyst layer,
 wherein the electrode member comprises: first contact portions in direct contact with the electrode catalyst layer; second contact portions in direct contact with the separator; and gas diffusion paths through which the gas flows,
 the electrode member is provided with a large number of pores formed therein, and constituted by a plate member having electrical conductivity and bent into a wave shape, and
 the electrode catalyst layer comprises: a catalyst component layer containing a catalyst component; a protection layer having electrical conductivity interposed between the catalyst component layer and the electrode member to prevent damage of the catalyst component layer; and a conductor provided on a surface of the protection layer and coming into contact with the first contact portions of the electrode member so as to electrically connect the protection layer to the electrode member.

2. The polymer electrolyte fuel cell according to claim 1, wherein the gas diffusion paths of the electrode member have first flow paths formed between the plate member and the electrode catalyst layer and between the plate member and the separator, and second flow paths composed of the pores.

3. The polymer electrolyte fuel cell according to claim 2, wherein the electrode member is provided in such a manner that the first flow paths are formed along a flow direction of the gas in a space between the electrode catalyst layer and the separator.

4. The polymer electrolyte fuel cell according to claim 1, wherein the separator has a planar surface with which the second contact portions of the electrode member are in contact.

5. The polymer electrolyte fuel cell according to claim 1, wherein a surface of the electrode member is subjected to an electrically-conductive corrosion-resistant treatment.

6. The polymer electrolyte fuel cell according to claim 5, wherein the electrically-conductive corrosion-resistant treatment is a coating with gold or electrical conductive carbon.

7. The polymer electrolyte fuel cell according to claim 1, wherein the plate member is made of a metal mesh, punching metal, etching metal or expanded metal.

8. The polymer electrolyte fuel cell according to claim 1, wherein the conductor has higher electrical conductivity than the protection layer.

9. The polymer electrolyte fuel cell according to claim 1, wherein the gas diffusion paths of the electrode member have first flow paths formed between the plate member and the electrode catalyst layer and between the plate member and the separator, and second flow paths composed of the pores, the conductor is composed of a plurality of linear electrical conductive members, and the linear electrical conductive members are provided parallel to or perpendicular to the first flow paths.

10. The polymer electrolyte fuel cell according to claim 1, wherein the conductor contains transition metal or electrical conductive carbon.

11. The polymer electrolyte fuel cell according to claim 1, wherein the conductor contains gold, silver, copper, or an electrical conductive paste composed of silver and resin.

12. The polymer electrolyte fuel cell according to claim 1, wherein when the conductor contains transition metal, a surface of the conductor in contact with the electrode member is subjected to gold plating.

* * * * *

UNITED STATES PATENT AND TRADEMARK OFFICE
CERTIFICATE OF CORRECTION

PATENT NO. : 8,309,267 B2
APPLICATION NO. : 13/131762
DATED : November 13, 2012
INVENTOR(S) : Shiro Tanaka et al.

It is certified that error appears in the above-identified patent and that said Letters Patent is hereby corrected as shown below:

TITLE PAGE: ITEM 75 should read

Shiro Tanaka, Yokohama (JP); Tomokatsu Himeno, Kanagawa (JP)

Signed and Sealed this
Fourteenth Day of April, 2015

Michelle K. Lee
*Director of the United States Patent and Trademark Office*